(12) United States Patent
Huang

(10) Patent No.: US 10,589,675 B1
(45) Date of Patent: Mar. 17, 2020

(54) BLIND SPOT AREA WARNING SYSTEM FOR A VEHICLE SIDE VIEW MIRROR WITH LIGHT GUIDE DISPOSED CAVITY OF A COVER HAVING AN INCIDENT FACE WITH GROOVES, AN END FACE, OUTPUT FACE AND OPPOSING OPERATING FACE

(71) Applicant: Mei-Hui Huang, Tainan (TW)

(72) Inventor: Mei-Hui Huang, Tainan (TW)

(*) Notice: Subject to any disclaimer, the term of this patent is extended or adjusted under 35 U.S.C. 154(b) by 0 days.

(21) Appl. No.: 16/254,661

(22) Filed: Jan. 23, 2019

(30) Foreign Application Priority Data

Dec. 28, 2018 (TW) .............................. 107147591 A

(51) Int. Cl.
*B60Q 9/00* (2006.01)
*F21V 8/00* (2006.01)
*B60R 1/06* (2006.01)
*B60Q 1/50* (2006.01)
*B60R 1/12* (2006.01)
*B60Q 1/26* (2006.01)

(52) U.S. Cl.
CPC ........... *B60Q 9/008* (2013.01); *B60Q 1/2665* (2013.01); *B60Q 1/50* (2013.01); *B60R 1/06* (2013.01); *B60R 1/1207* (2013.01); *G02B 6/0016* (2013.01); *G02B 6/0083* (2013.01)

(58) Field of Classification Search
CPC .... B60Q 1/2665; F21S 43/236; F21S 43/241; F21S 43/247; G02B 6/0016; B60R 1/12; B60R 1/1207
See application file for complete search history.

(56) References Cited

U.S. PATENT DOCUMENTS 7,771,062 B2 * 8/2010 Kuhn ................... B60Q 1/2665
359/839
2004/0161222 A1 * 8/2004 Niida ....................... G02B 6/42
385/146

* cited by examiner

*Primary Examiner* — Robert J May
(74) *Attorney, Agent, or Firm* — Alan D. Kamrath; Karin L. Williams; Mayer & Williams PC

(57) ABSTRACT

A blind spot area warning and illustrating device includes a light guiding member including a light output face and a light incident face having grooves. The light guiding member further includes an operating face opposite to the light output face and having reflective faces. Each reflective face is at an acute angle to the light output face. A cover is mounted around the light guiding member. The light output face of the light guiding member is aligned with a light transmitting area of a mirror of a side view mirror. A light emitting diode lamp is mounted in the cover and is aligned with the light incident face. When the light emitting diode lamp is activated to emit light, the grooves diffuse the light emitted by the light emitting diode lamp, and the reflective faces reflect the diffused light to uniformly pass outwardly through the light output face.

18 Claims, 7 Drawing Sheets

BLIND SPOT AREA WARNING SYSTEM FOR A VEHICLE SIDE VIEW MIRROR WITH LIGHT GUIDE DISPOSED CAVITY OF A COVER HAVING AN INCIDENT FACE WITH GROOVES, AN END FACE, OUTPUT FACE AND OPPOSING OPERATING FACE

BACKGROUND OF THE INVENTION

The present invention relates to a blind spot area warning and illustrating device for a vehicle side view mirror and, more particularly, to a blind spot area warning and illustrating device mounted to a side view mirror at a side of a vehicle to provide uniform, bright, alarming light, reminding a driver of incoming vehicles at the side of the vehicle.

Side view mirrors provided on two sides of a vehicle permit the driver of the vehicle to be aware of the road conditions on two sides of the vehicle, such that the driver can be alerted for proper responses before or during changing the lane. However, the driver cannot see vehicles in the blind spots at two sides of the vehicle. In an approach, an alarming device in the form of a lighting element, such as an LED lamp, is mounted in a housing of each side view mirror and is electrically connected to one of two sensors respectively mounted to two ends of a tail of the vehicle. A mirror of each side view mirror includes a light transmittable section aligned with one of the lighting elements. When one of the two sensors detects the presence of a vehicle in the blind spot at a side of the vehicle, the associated lighting element is activated to emit light beams to alert the driver of the vehicle in the blind spot. However, the light beams emitted from the lighting element could dazzle the eyes of the driver and could cause accidents. The risk of accidents is increased in the case of night driving in which the pupils of the driver dilate at night. If diffusing agents are added into the alarming device to homogenize the light beams, the manufacturing costs are significantly increased.

BRIEF SUMMARY OF THE INVENTION

The present invention provides a blind spot area warning and illustrating device for a vehicle side view mirror. The blind spot area warning and illustrating device includes a light guiding member including a light output face, an operating face spaced from the light output face in a length direction and extending in a non-parallel fashion to the light output face, a light incident face extending between the light output face and the operating face, and an end face extending between the light output face and the operating face and spaced from the light incident face in a vertical direction perpendicular to the length direction. The light incident face has a length in the length direction larger than a length of the end face in the length direction. The light incident face includes a plurality of grooves. The operating face includes a plurality of recesses defining a plurality of reflective faces. Each of the plurality of reflective faces is at an acute angle to the light output face. A cover is mounted around the light guiding member and includes a first surface, a second surface spaced from the first surface in the length direction, and an outer periphery extending between the first surface and the second surface. A chamber is recessed into the first surface and receives the light guiding member. The light output face of the light guiding member is configured to be aligned with a light transmitting area of a mirror of the side view mirror. A circuit board is mounted in the chamber of the cover and includes a light emitting diode lamp aligned with the light incident face of the light guiding member. When the light emitting diode lamp is activated to emit light, the plurality of grooves diffuses light emitted by the light emitting diode lamp, and the plurality of reflective faces reflects the diffused light to uniformly pass outwardly through the light output face.

In an example, the light guiding member further includes a first lateral side extending between the light output face and the operating face and a second lateral side extending between the light output face and the operating face and spaced from the first lateral side in a lateral direction perpendicular to the length direction and the vertical direction. Each of the plurality of recesses extends from the first lateral side through the second lateral side, and the acute angle between each of the plurality of reflective faces and the light output face is in a range between 26° and 45°.

In another example, the light guiding member further includes a first lateral side extending between the light output face and the operating face and between the light incident face and the end face. The light guiding member further includes a second lateral side extending between the light output face and the operating face, extending between the light incident face and the end face, and spaced from the first lateral side in a lateral direction perpendicular to the length direction and the vertical direction. Each of the plurality of recesses and each of the plurality of reflective faces extend from the first lateral side through the second lateral side. The acute angle between each of the plurality of reflective faces and the light output face is in a range between 31° and 40°. The acute angle between the light output face and a first one of the plurality of reflective faces proximate to the light incident face is 31°. The acute angle between one of the plurality of reflective faces and the light output face is larger than the acute angle between the light output face and another of the plurality of reflective faces next to the one of the plurality of reflective faces in the vertical direction towards the light incident face by an angle between 0.5° and 1°. The acute angle between the light output face and a last one of the plurality of reflective faces proximate to the end face is 40°.

In a further example, the light guiding member further includes a first lateral side extending between the light output face and the operating face and between the light incident face and the end face. The light guiding member further includes a second lateral side extending between the light output face and the operating face, extending between the light incident face and the end face, and spaced from the first lateral side in a lateral direction perpendicular to the length direction and the vertical direction. Each of the plurality of recesses and each of the plurality of reflective faces extend from the first lateral side through the second lateral side. The acute angle between one of the plurality of reflective faces and the light output face is larger than the acute angle between the light output face and another of the plurality of reflective faces next to the one of the plurality of reflective faces in the vertical direction towards the light incident face by an angle between 0.5° and 1°.

In an example, each of the plurality of grooves of the light incident face includes two sides. Two adjacent grooves share one of the two sides. Each of the two sides of each of the plurality of grooves has a width between 0.5 mm and 2 mm in the lateral direction.

In an example, each of the plurality of grooves has a depth from a bottom thereof to the light incident face, and the depth is between 0.5 mm and 2 mm in the vertical direction.

In an example, the light emitting diode lamp has a beam angle between 10° and 120°.

In an example, the light emitting diode lamp has a beam angle of 60°+10°.

In an example, a board is bonded to the light output face of the light guiding member and includes a hole through which light passes, and the hole is configured to be aligned with a light transmitting area of the mirror.

The present invention will become clearer in light of the following detailed description of illustrative embodiments of this invention described in connection with the drawings.

Figure 1:
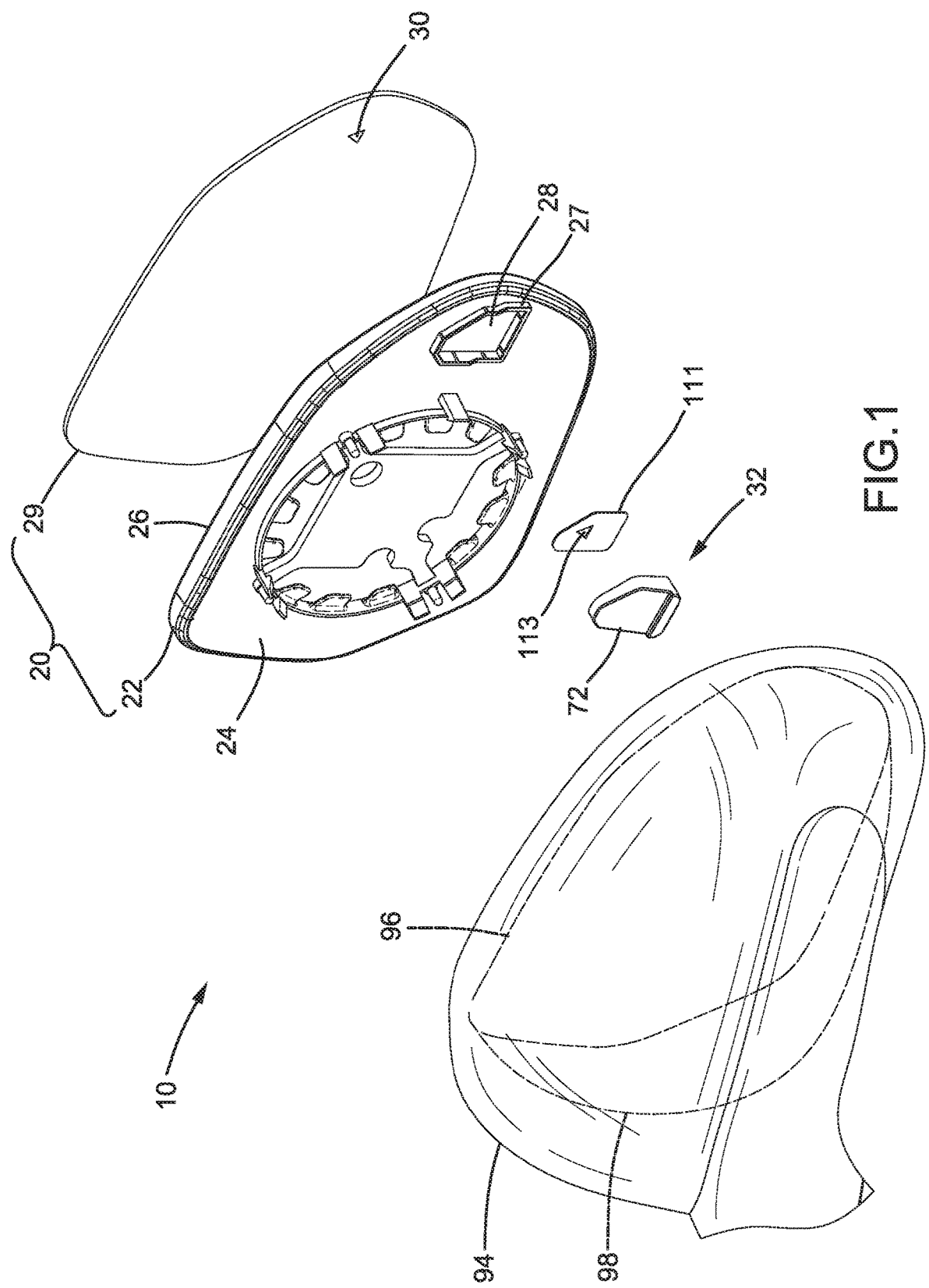
FIG. 1 is an exploded, perspective view of a blind spot area warning and illustrating device mounted on a vehicle side view mirror of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "side", "end", "portion", "section", "axial", "lateral", "vertical", "outward", "inward", "length", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

With reference to FIGS. 1-6, a blind spot area warning and illustrating device 32 according to the present invention is mounted to a mirror seat 22 of a mirror unit 20 of a side view mirror 10 of a vehicle. The side view mirror 10 includes a housing 94 having an opening 96 in a surface thereof and a compartment 98 recessed inward from the opening 96 into the housing 94. The mirror seat 22 includes a first surface 24 and a second surface 26 spaced from the first surface 24 in a length direction. The mirror seat 22 further includes a positioning section 27 having a window 28 extending from the first surface 24 through the second surface 26. The window 28 receives the blind spot area warning and illustrating device 32. The mirror unit 20 further includes a mirror 29 having a light transmitting area 30. The mirror 29 is bonded by an adhesive layer 115 to the second surface 26 of the mirror seat 22 (FIG. 5) with the light transmitting area 30 aligned with the window 28. The mirror unit 20 is placed into the housing 94 with the first surface 24 facing the opening 96 and is securely mounted in the compartment 98 of the housing 94.

Figure 2:
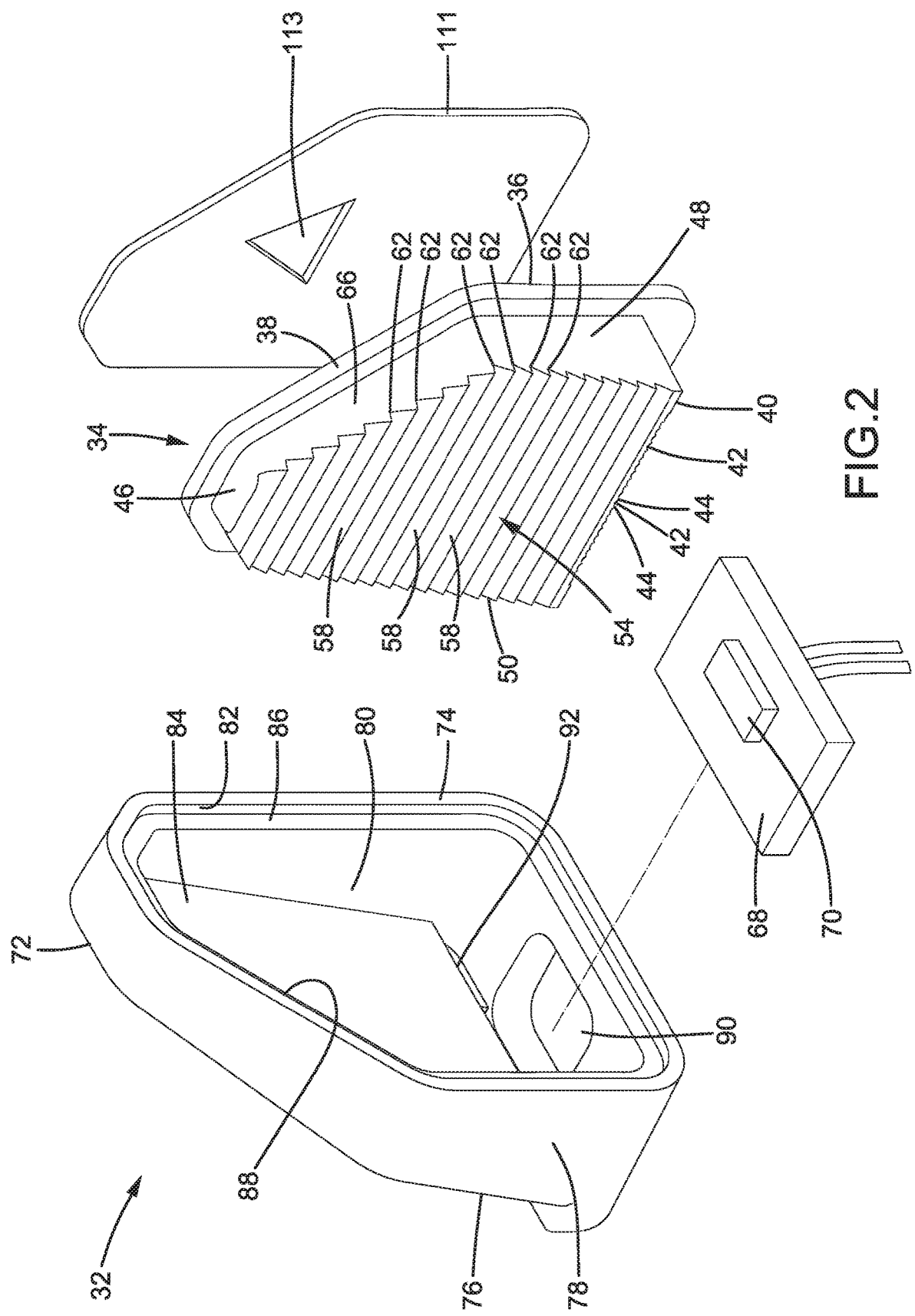
FIG. 2 is an exploded, perspective view of the blind spot area warning and illustrating device of FIG. 1.
Figure 3:
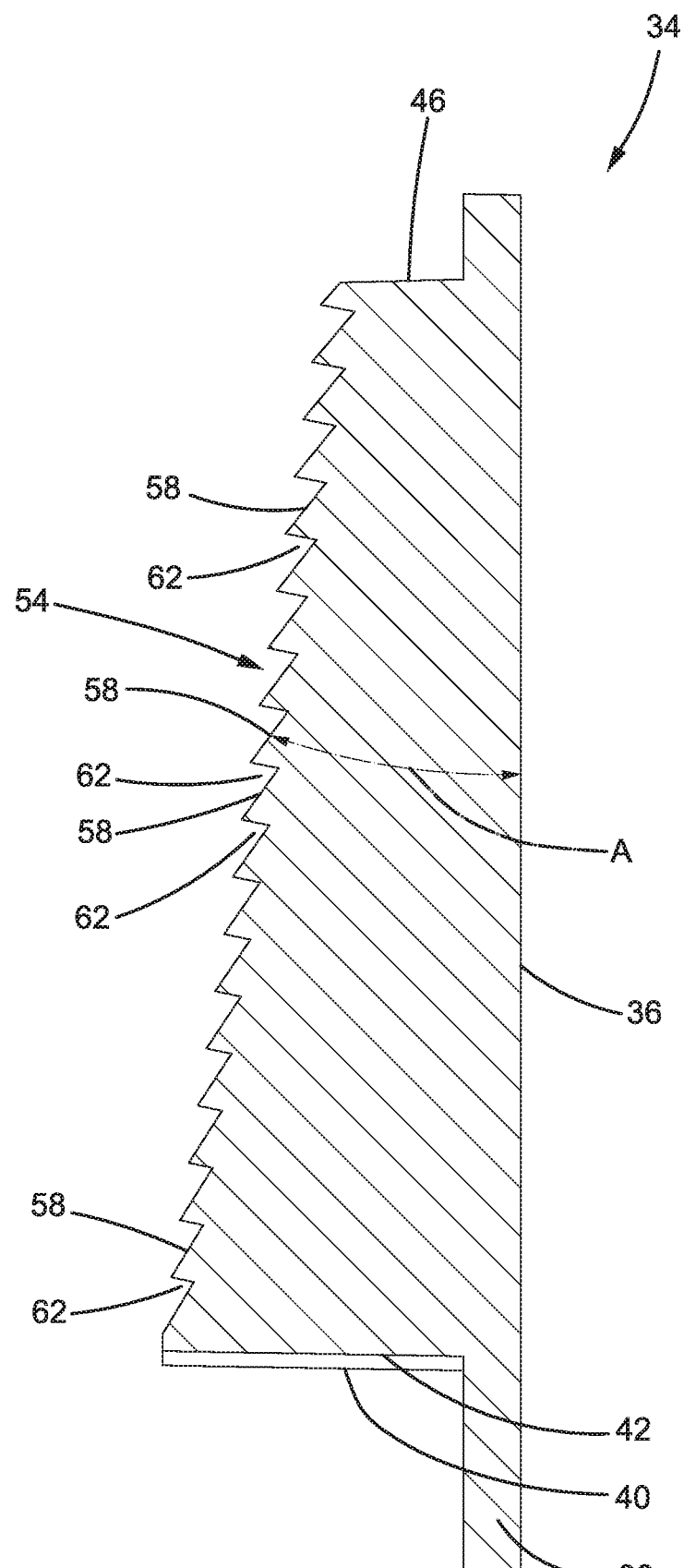
FIG. 3 is a cross sectional view of a light guiding member of the blind spot area warning and illustrating device of FIG. 2.
Figure 4:
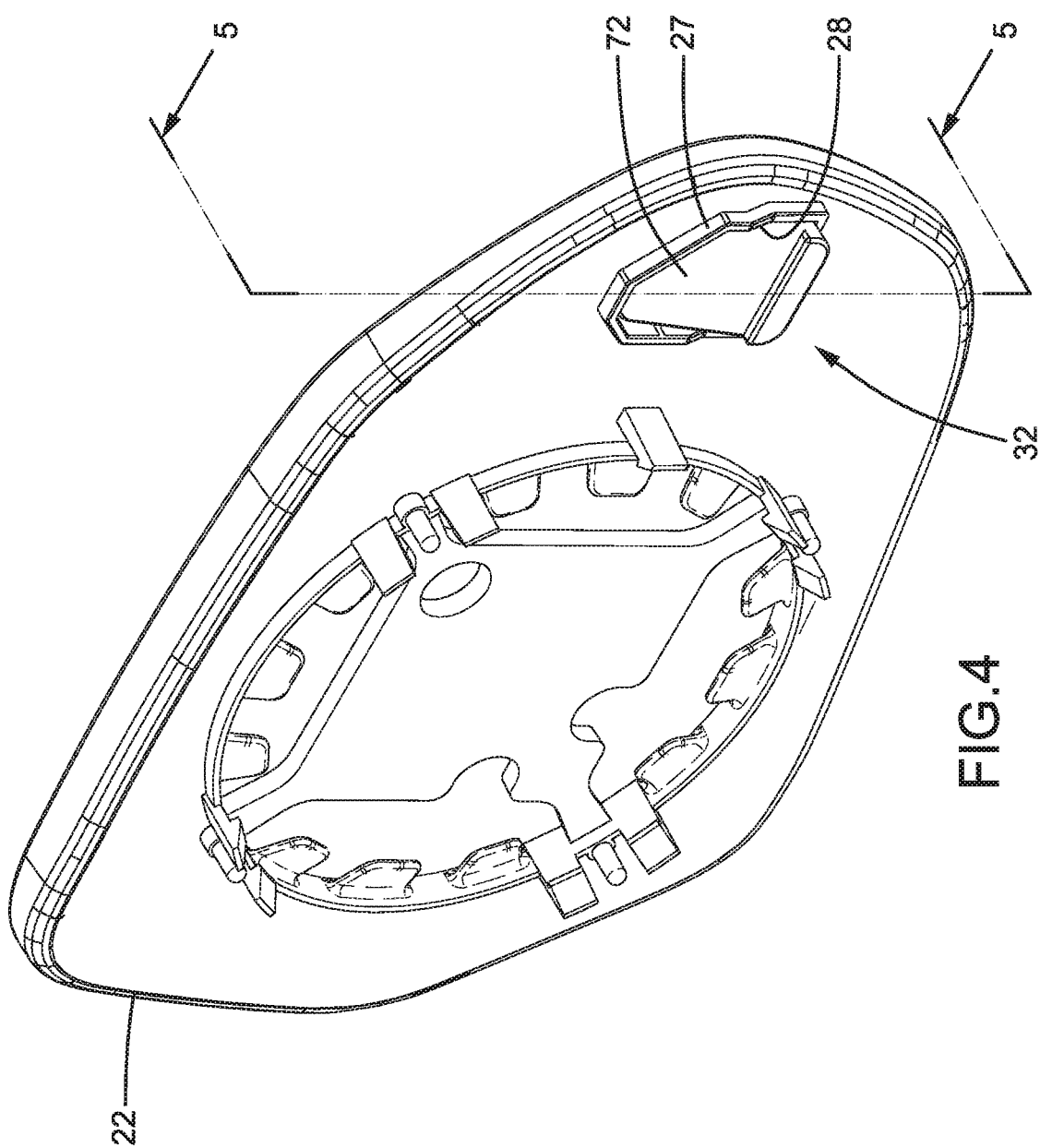
FIG. 4 is a perspective view of the blind spot area warning and illustrating device according to the present invention mounted to a mirror unit.

With reference to FIGS. 2 and 3, the blind spot area warning and illustrating device 32 includes a light guiding member 34 made of a light transmitting material and a cover 72 mounted around the light guiding member 34. A circuit board 68 is mounted in the cover 72 and includes a light emitting diode (LED) lamp 70. The light transmitting material can be, but not limited to, polycarbonate (PC), polymethyl methacrylate (PMMA), and polystyrene (PS).

With reference to FIGS. 2 and 3, the light guiding member 34 includes a light output face 36, an operating face 54 spaced from the light output face 36 in the length direction and extending in a non-parallel fashion to the light output face 36, a light incident face 40 extending between the light output face 36 and the operating face 54, and an end face 46 extending between the light output face 36 and the operating face 54 and spaced from the light incident face 40 in a vertical direction perpendicular to the length direction. The light guiding member 34 further includes a first lateral side 48 extending between the light output face 36 and the operating face 54 and between the light incident face 40 and the end face 46. The light guiding member 34 further includes a second lateral side 50 extending between the light output face 36 and the operating face 54, extending between the light incident face 40 and the end face 46, and spaced from the first lateral side 48 in a lateral direction perpendicular to the length direction and the vertical direction. A positioning portion 38 is formed along a periphery of the light output face 36 and includes an inclined section 66 between the first lateral side 48 and the end face 46. The light incident face 40 has a length in the length direction larger than a length of the end face 46 in the length direction. The operating face 54 gradually inclines from the light incident face 40 towards the light output face 36 in the vertical direction. Thus, the light guiding member 34 is substantially a wedge-shaped member when viewed from the lateral side (see FIG. 3). The light output face 36 of the light guiding member 34 is configured to be aligned with the light transmitting area 30 of the mirror 29 of the side view mirror 10.

The light incident face 40 includes a plurality of grooves 42. Each of the plurality of grooves 42 has two sides 44, and two adjacent grooves 42 share a same side 44. Each of the two sides 44 of each of the plurality of grooves 42 has a width of 0.5-2 mm in the lateral direction. Furthermore, each of the plurality of grooves 42 has a depth from a bottom thereof to the light incident face 40, and the depth is between 0.5 mm and 2 mm in the vertical direction.

With reference to FIGS. 2 and 3, the operating face 54 includes a plurality of recesses 62 extending from the first lateral side 48 through the second lateral side 50 and defining a plurality of reflective faces 58 extending from the first lateral side 48 through the second lateral side 50. Each of the plurality of reflective faces 58 is at an acute angle A to the light output face 36. The acute angle A is in a range between 26° and 45°, preferably between 31° and 40°. In an example, the acute angle A between the light output face 36 and a first one of the plurality of reflective faces 58 proximate to the light incident face 40 is 31°. The acute angle A between one of the plurality of reflective faces 58 and the light output face 36 is larger than the acute angle A between the light output face 36 and another of the plurality of reflective faces 58 next to the one of the plurality of reflective faces 58 in the vertical direction towards the light incident face 40 by an angle between 0.5° and 1°. The acute angle A between the light output face 36 and a last one of the plurality of reflective faces 58 proximate to the end face 46 is 40°.

With reference to FIG. 2, the cover 72 is a housing through which light cannot transmit. The cover 72 includes a first surface 74, a second surface 76 spaced from the first surface 74 in the length direction, and an outer periphery 78 extending between the first surface 74 and the second surface 76. The outer periphery 78 of the cover 72 has a shape identical to the window 28 of the mirror seat 22. A chamber 80 is recessed into the first surface 74 and receives the light guiding member 34. The chamber 80 includes a bottom face 84 and an inner periphery 82 extending perpendicularly from a periphery of the bottom face 84. The inner periphery 82 has a chambered face 88. An insertion groove 86 is formed between the first surface 74 and the inner periphery 82. The bottom face 84 is a matte surface. A through-hole 90 extends through the outer periphery 78 and the inner periphery 82 to communicate with the chamber 80. The cover 72 further includes an engagement groove 92 adjacent to the through-hole 90.

Figure 5:
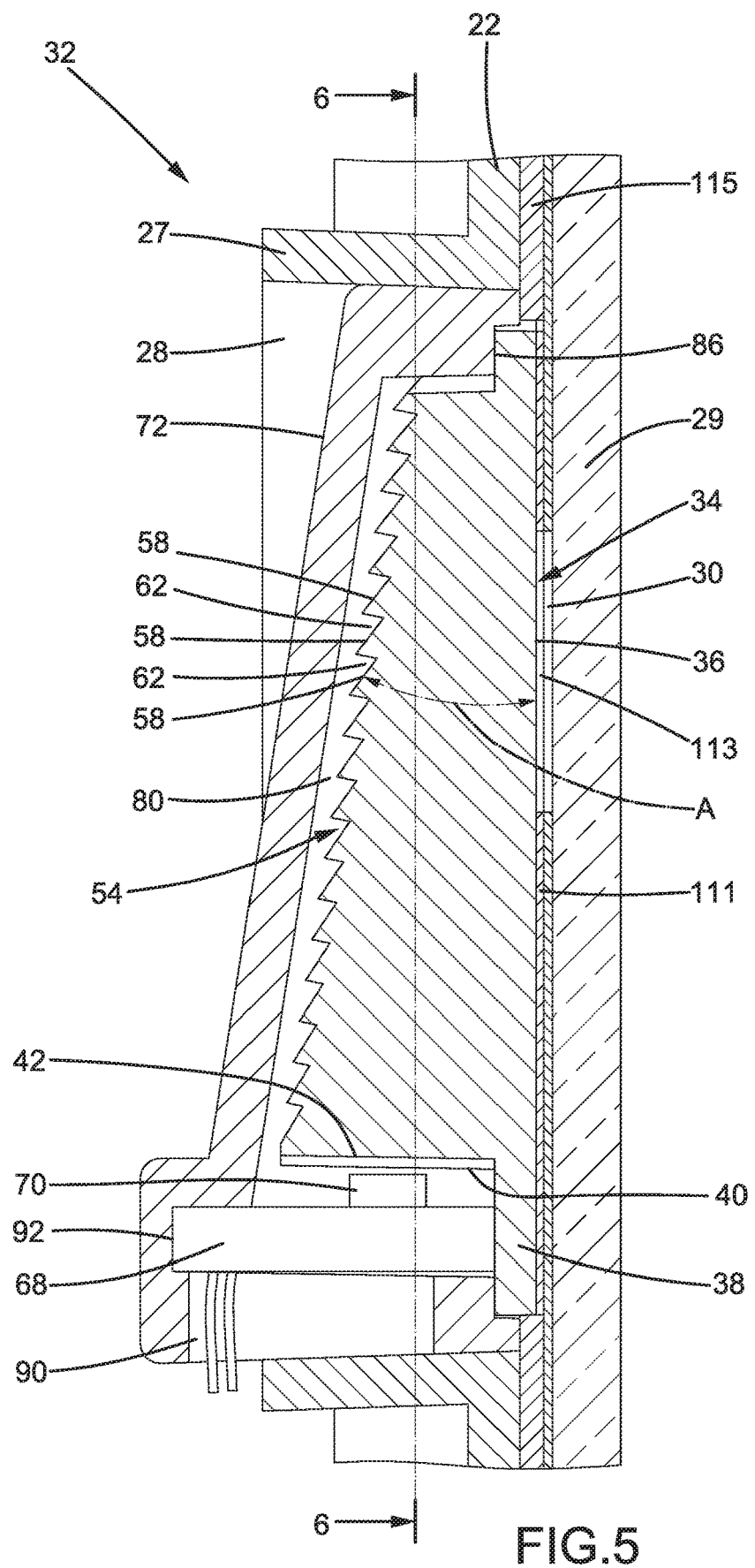
FIG. 5 is a cross sectional view taken along section line 5-5 of FIG. 4.
Figure 6:
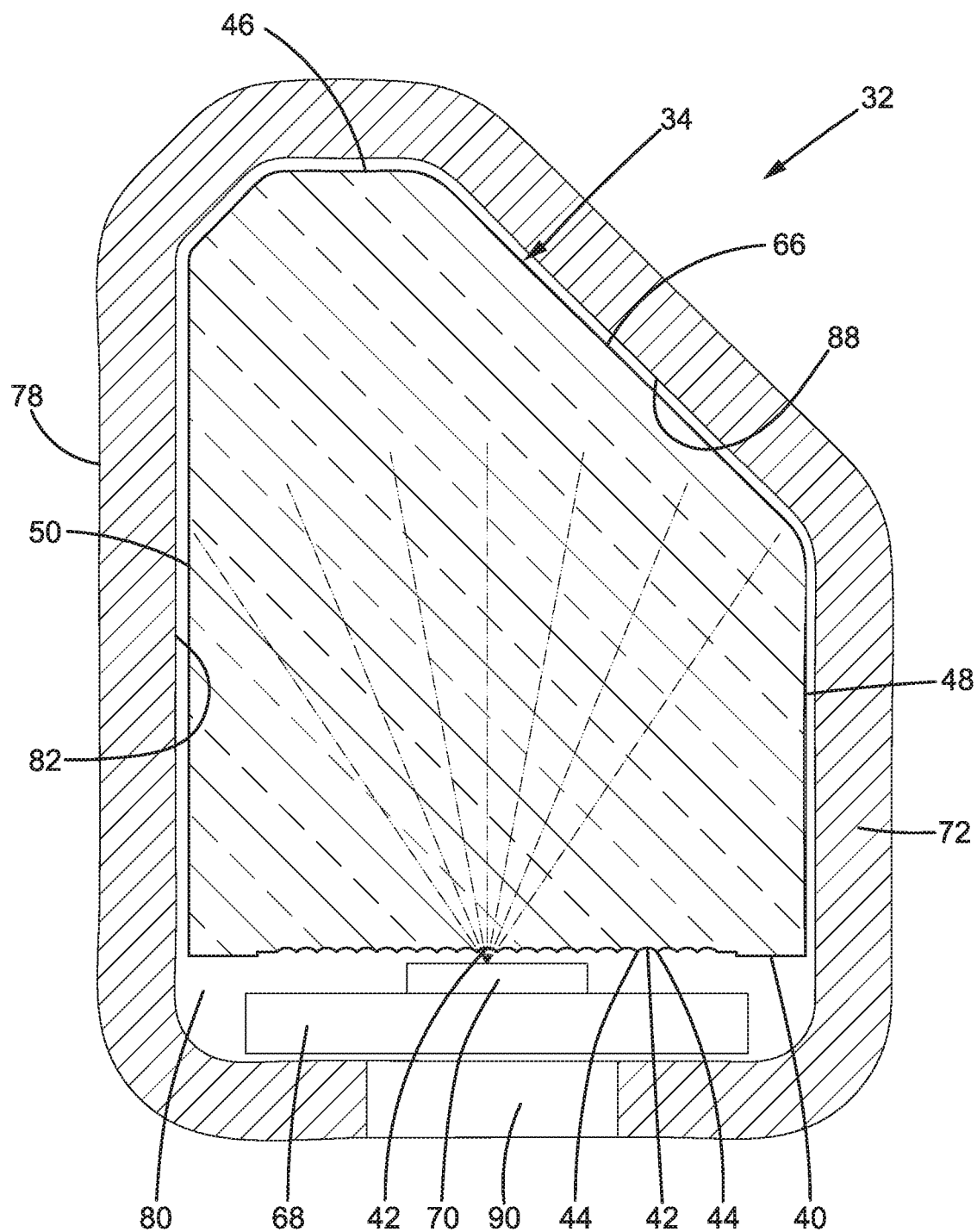
FIG. 6 is a cross sectional view taken along section line 6-6 of FIG. 5, illustrating diffusion of light beams from an LED lamp.

With reference to FIGS. 2, 5, and 6, the circuit board 68 is electrically connected to a sensor mounted to a side of the vehicle. An optical axis 71 of the light outputted by the LED lamp 70 on the circuit board 68 has directivity. According to the definition of a beam angle by the International Commission on Illumination (CIE), the beam angle of the LED lamp 70 is between 10° and 120°, preferably between 40° and 80°, and more preferably 60°±10°.

Figure 7:
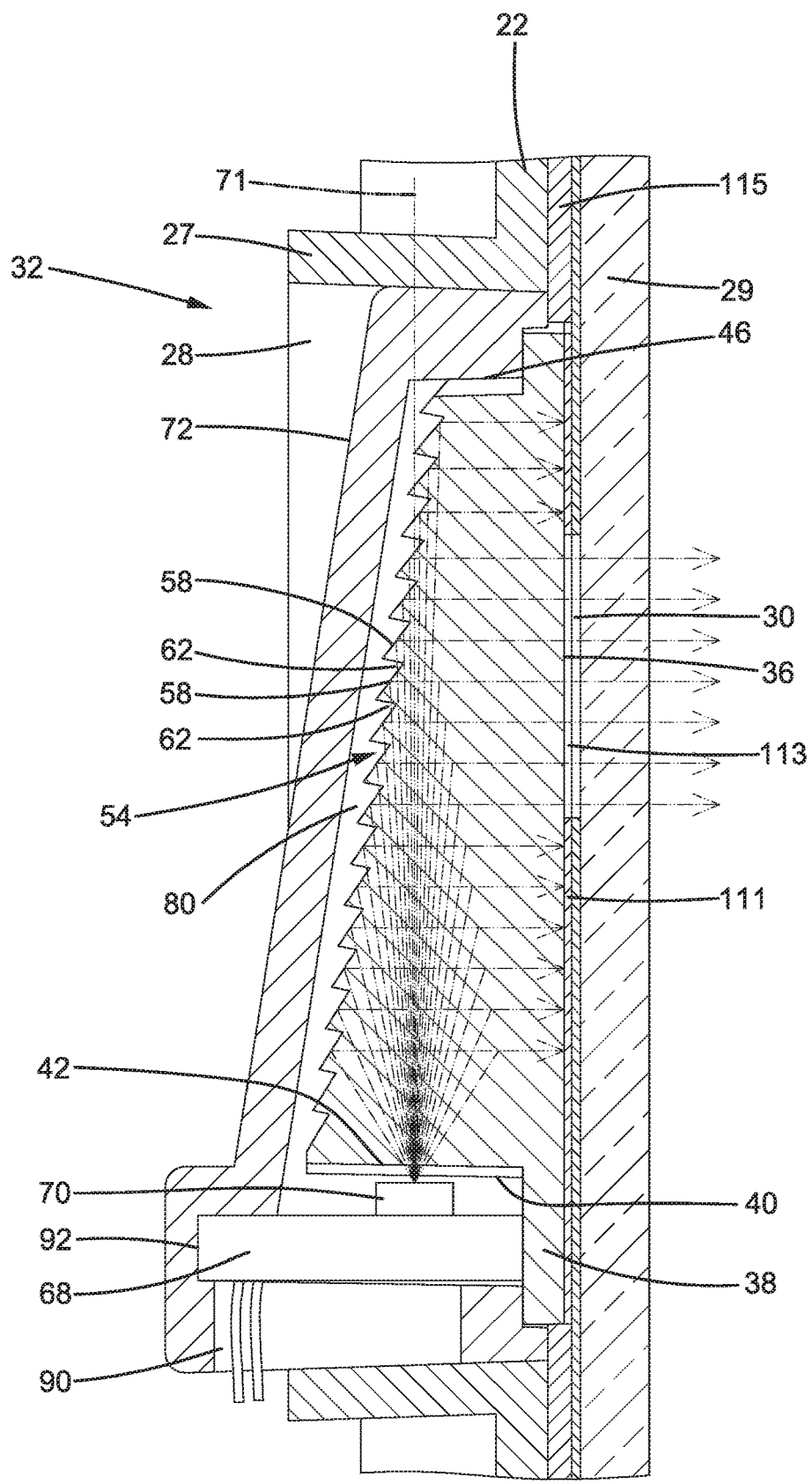
FIG. 7 is a cross sectional view illustrating light passage in the blind spot area warning and illustrating device according to the present invention.

With reference to FIGS. 5-7, in assembly, a side of the circuit board 68 is disposed in the engagement groove 92 of the cover 72 with the LED lamp 70 aligned with the light incident face 40 of the light guiding member 34. The optical axis 71 of the light outputted by the LED lamp 70 extends in the vertical direction. The light beams of the light from the LED lamp 70 cover one or more of the plurality of grooves 42. The cover 72 is mounted around the light guiding member 34. Thus, the light guiding member 34 extends into the chamber 80 of the cover 72, and the positioning portion 38 of the light guiding member 34 is received in the insertion groove 86. Furthermore, the inclined section 66 of the light guiding member 34 is aligned with the chamfered face 88 of the cover 72. Furthermore, with the light output face 36 of the light guiding member 34 facing the window 28 of the mirror seat 22, the light guiding member 34 is inserted until the outer periphery 78 of the cover 72 is press-fit in the window 28 for positioning purposes. Furthermore, the through-hole 90 of the cover 72 is partially exposed via the window 28, such that the sensor mounted to the side of the vehicle can be connected by a wire extending through the through-hole 90 into the chamber 80 for electrical connection with the circuit board 68. A board 111 is bonded to the light output face 36 and includes a hole 113 through which light passes, and the hole 113 is aligned with a light transmitting area 30 of the mirror 29.

When the sensor mounted to the side of the vehicle detects the presence of an incoming vehicle in the blind spot area, the LED lamp 70 is activated to emit light incident to the plurality of grooves 42 of the light incident face 40. One or more of the plurality of grooves 42 diffuse the light into the light guiding member 34. Then, the plurality of reflective faces 58 reflects the light towards the light output face 36 by total internal reflection. Thus, the uniformly diffused and reflected light exits via the hole 113 of the board 111 and the light transmitting area 30 of the mirror 29. Accordingly, the blind spot area warning and illustrating device 32 can generate uniform, bright, alarming light on the side view mirror 10, protecting the eyes of the driver from dazzling light from the LED lamp 70. Furthermore, the driver is provided with an alarming effect by uniform, bright, visual light through the diffusion and reflection of the light from the LED lamp 70 without adding diffusing agents into the light guiding member 34 and without increasing the manufacturing costs.

Now that the basic teachings of the present invention have been explained, many extensions and variations will be obvious to one having ordinary skill in the art. For example, two adjacent grooves 42 of the light incident face 40 of the light guiding member 34 do not have to share a same side 44.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A blind spot area warning and illustrating device for the side view mirror of the vehicle comprising:
    a light guiding member including a light output face, an operating face spaced from the light output face in a length direction and extending in a non-parallel fashion to the light output face, a light incident face extending between the light output face and the operating face, and an end face extending between the light output face and the operating face and spaced from the light incident face in a vertical direction perpendicular to the length direction, wherein the light incident face has a length in the length direction larger than a length of the end face in the length direction, wherein the light incident face includes a plurality of grooves, wherein the operating face includes a plurality of recesses defining a plurality of reflective faces, and wherein each of the plurality of reflective faces is at an acute angle to the light output face;
    a cover mounted around the light guiding member and including a first surface, a second surface spaced from the first surface in the length direction, and an outer periphery extending between the first surface and the second surface, wherein a chamber is recessed into the first surface, wherein the light guiding member is received in the chamber, and wherein the light output face of the light guiding member is configured to be aligned with a light transmitting area of a mirror of the side view mirror; and
    a circuit board mounted in the chamber of the cover and including a light emitting diode lamp aligned with the light incident face of the light guiding member, wherein when the light emitting diode lamp is activated to emit light, the plurality of grooves diffuses light emitted by the light emitting diode lamp, and the plurality of reflective faces reflects the diffused light to uniformly pass outwardly through the light output face, wherein the light guiding member further includes a first lateral side extending between the light output face and the operating face and a second lateral side extending between the light output face and the operating face and spaced from the first lateral side in a lateral direction perpendicular to the length direction and the vertical direction, wherein each of the plurality of recesses extends from the first lateral side through the second lateral side, and wherein the acute angle between each of the plurality of reflective faces and the light output face is in a range between 26° and 45°.

2. The blind spot area warning and illustrating device for the side view mirror of the vehicle as claimed in claim 1, wherein each of the plurality of grooves of the light incident face includes two sides, wherein two adjacent grooves share one of the two sides, and wherein each of the two sides of each of the plurality of grooves has a width between 0.5 mm and 2 mm in the lateral direction.

3. The blind spot area warning and illustrating device for the side view mirror of the vehicle as claimed in claim 1, wherein each of the plurality of grooves has a depth from a bottom thereof to the light incident face, and wherein the depth is between 0.5 mm and 2 mm in the vertical direction.

4. The blind spot area warning and illustrating device for the side view mirror of the vehicle as claimed in claim 1, wherein the light emitting diode lamp has a beam angle between 10° and 120°.

5. The blind spot area warning and illustrating device for the side view mirror of the vehicle as claimed in claim 1, wherein the light emitting diode lamp has a beam angle of 60°±10°.

6. The blind spot area warning and illustrating device for the side view mirror of the vehicle as claimed in claim 1, further comprising a board bonded to the light output face of the light guiding member, wherein the board includes a hole through which light passes, and wherein the hole is configured to be aligned with a light transmitting area of the mirror.

7. A blind spot area warning and illustrating device for the side view mirror of the vehicle comprising:

a light guiding member including a light output face, an operating face spaced from the light output face in a length direction and extending in a non-parallel fashion to the light output face, a light incident face extending between the light output face and the operating face, and an end face extending between the light output face and the operating face and spaced from the light incident face in a vertical direction perpendicular to the length direction, wherein the light incident face has a length in the length direction larger than a length of the end face in the length direction, wherein the light incident face includes a plurality of grooves, wherein the operating face includes a plurality of recesses defining a plurality of reflective faces, and wherein each of the plurality of reflective faces is at an acute angle to the light output face;

a cover mounted around the light guiding member and including a first surface, a second surface spaced from the first surface in the length direction, and an outer periphery extending between the first surface and the second surface, wherein a chamber is recessed into the first surface, wherein the light guiding member is received in the chamber, and wherein the light output face of the light guiding member is configured to be aligned with a light transmitting area of a mirror of the side view mirror; and a circuit board mounted in the chamber of the cover and including a light emitting diode lamp aligned with the light incident face of the light guiding member, wherein when the light emitting diode lamp is activated to emit light, the plurality of grooves diffuses light emitted by the light emitting diode lamp, and the plurality of reflective faces reflects the diffused light to uniformly pass outwardly through the light output face, wherein the light guiding member further includes a first lateral side extending between the light output face and the operating face and between the light incident face and the end face, wherein the light guiding member further includes a second lateral side extending between the light output face and the operating face, extending between the light incident face and the end face, and spaced from the first lateral side in a lateral direction perpendicular to the length direction and the vertical direction, wherein each of the plurality of recesses and each of the plurality of reflective faces extend from the first lateral side through the second lateral side, wherein the acute angle between each of the plurality of reflective faces and the light output face is in a range between 31° and 40°, wherein the acute angle between the light output face and a first one of the plurality of reflective faces proximate to the light incident face is 31°, wherein the acute angle between one of the plurality of reflective faces and the light output face is larger than the acute angle between the light output face and another of the plurality of reflective faces next to the one of the plurality of reflective faces in the vertical direction towards the light incident face by an angle between 0.5° and 1°, and wherein the acute angle between the light output face and a last one of the plurality of reflective faces proximate to the end face is 40°.

8. The blind spot area warning and illustrating device for the side view mirror of the vehicle as claimed in claim 7, wherein each of the plurality of grooves of the light incident face includes two sides, wherein two adjacent grooves share one of the two sides, and wherein each of the two sides of each of the plurality of grooves has a width between 0.5 mm and 2 mm in the lateral direction.

9. The blind spot area warning and illustrating device for the side view mirror of the vehicle as claimed in claim 7, wherein each of the plurality of grooves has a depth from a bottom thereof to the light incident face, and wherein the depth is between 0.5 mm and 2 mm in the vertical direction.

10. The blind spot area warning and illustrating device for the side view mirror of the vehicle as claimed in claim 7, wherein the light emitting diode lamp has a beam angle between 10° and 120°.

11. The blind spot area warning and illustrating device for the side view mirror of the vehicle as claimed in claim 7, wherein the light emitting diode lamp has a beam angle of 60°±10°.

12. The blind spot area warning and illustrating device for the side view mirror of the vehicle as claimed in claim 7, further comprising a board bonded to the light output face of the light guiding member, wherein the board includes a hole through which light passes, and wherein the hole is configured to be aligned with a light transmitting area of the mirror.

13. A blind spot area warning and illustrating device for the side view mirror of the vehicle comprising:

a light guiding member including a light output face, an operating face spaced from the light output face in a length direction and extending in a non-parallel fashion to the light output face, a light incident face extending between the light output face and the operating face, and an end face extending between the light output face and the operating face and spaced from the light incident face in a vertical direction perpendicular to the length direction, wherein the light incident face has a length in the length direction larger than a length of the end face in the length direction, wherein the light incident face includes a plurality of grooves, wherein the operating face includes a plurality of recesses defining a plurality of reflective faces, and wherein each of the plurality of reflective faces is at an acute angle to the light output face;

a cover mounted around the light guiding member and including a first surface, a second surface spaced from the first surface in the length direction, and an outer periphery extending between the first surface and the second surface, wherein a chamber is recessed into the first surface, wherein the light guiding member is received in the chamber, and wherein the light output face of the light guiding member is configured to be aligned with a light transmitting area of a mirror of the side view mirror; and a circuit board mounted in the chamber of the cover and including a light emitting diode lamp aligned with the light incident face of the light guiding member, wherein when the light emitting diode lamp is activated to emit light, the plurality of grooves diffuses light emitted by the light emitting diode lamp, and the plurality of reflective faces reflects the diffused light to uniformly pass outwardly through the light output face, wherein the light guiding member further includes a first lateral side extending between the light output face and the operating face and between the light incident face and the end face, wherein the light guiding member further includes a second lateral side extending between the light output face and the operating face, extending between the light incident face and the end face, and spaced from the first lateral side in a lateral direction perpendicular to the length direction and the vertical direction, wherein each of the plurality of recesses and each of the plurality of reflective faces extend from the first lateral side through the second lateral side, and wherein the acute angle between one of the plurality of reflective faces and the light output face is larger than the acute angle between the light output face and another of the plurality of reflective faces next to the one of the plurality of reflective faces in the vertical direction towards the light incident face by an angle between 0.5° and 1°.

14. The blind spot area warning and illustrating device for the side view mirror of the vehicle as claimed in claim 13, wherein each of the plurality of grooves of the light incident face includes two sides, wherein two adjacent grooves share one of the two sides, and wherein each of the two sides of each of the plurality of grooves has a width between 0.5 mm and 2 mm in the lateral direction.

15. The blind spot area warning and illustrating device for the side view mirror of the vehicle as claimed in claim 13, wherein each of the plurality of grooves has a depth from a bottom thereof to the light incident face, and wherein the depth is between 0.5 mm and 2 mm in the vertical direction.

16. The blind spot area warning and illustrating device for the side view mirror of the vehicle as claimed in claim 13, wherein the light emitting diode lamp has a beam angle between 10° and 120°.

17. The blind spot area warning and illustrating device for the side view mirror of the vehicle as claimed in claim 13, wherein the light emitting diode lamp has a beam angle of 60°±10°.

18. The blind spot area warning and illustrating device for the side view mirror of the vehicle as claimed in claim 13, further comprising a board bonded to the light output face of the light guiding member, wherein the board includes a hole through which light passes, and wherein the hole is configured to be aligned with a light transmitting area of the mirror.

* * * * *